Figure 1A:
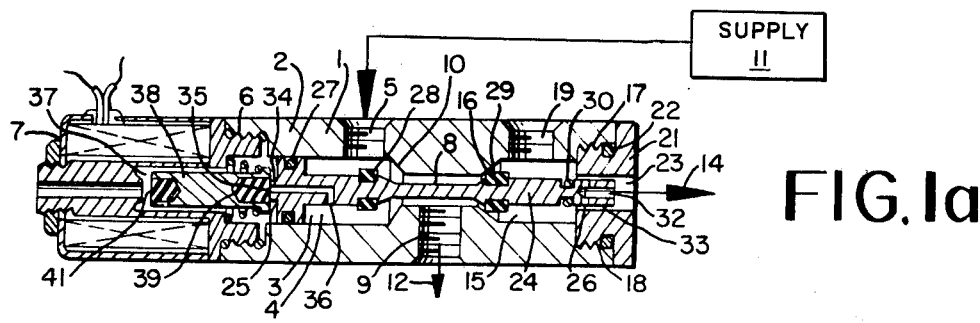

United States Patent [19] [11] 3,916,952
Pauliukonis [45] Nov. 4, 1975

[54] ENERGY CONSERVING TANDEM DIRECTIONAL VALVE

[76] Inventor: Richard S. Pauliukonis, 6660 Greenbriar Drive, Parma Heights, Ohio 44130

[22] Filed: Dec. 10, 1973

[21] Appl. No.: 423,534

Related U.S. Application Data

[63] Continuation of Ser. No. 243,171, April 12, 1972, Pat. No. 3,824,898.

[52] U.S. Cl. .......................................... 137/625.64
[51] Int. Cl.² F15B 13/042; F16K 11/02; F16K 31/40
[58] Field of Search....... 137/625.6, 625.64, 625.66, 137/625.27, 625.69, 626.67

[56] References Cited
UNITED STATES PATENTS

| 2,913,005 | 11/1959 | Grant et al. | 137/625.6 |
| 2,965,132 | 12/1960 | Couffer, Jr. et al. | 137/625.64 |
| 3,002,532 | 10/1961 | Carlson | 137/625.66 |
| 3,266,521 | 8/1966 | Brinkel et al. | 137/625.66 |
| 3,470,909 | 10/1969 | Reis | 137/625.6 |
| 3,706,325 | 12/1972 | Pauliukonis | 137/625.66 |
| 3,807,448 | 4/1974 | Hadden | 137/625.6 X |

Primary Examiner—Martin P. Schwadron
Assistant Examiner—Robert J. Miller

[57] ABSTRACT

Directional Control Valves for use with pressurized Hydraulic/Pneumatic fluids to be flowed therethrough in tandem with conservation of energy include an elongated valve body with a bore therethrough one end of which is provided with valve operator and another end adaptable to be connected to a source of pressurized fluid including three perpendicular ports provided therein and a stem inside said bore for selectively directing fluid therethrough before exhausting into the atmosphere or being returned back into the reservoir.

6 Claims, 4 Drawing Figures

ENERGY CONSERVING TANDEM DIRECTIONAL VALVE

This is a continuation in part of my copending application Ser. No. 243,171 filed Apr. 12, 1972 now allowed to issue as a U.S. Pat. No. 3,824,898.

This invention has application in the fluid power industry which employs directional valves for cylinder actuation, and more specifically to a directional valve designed to conserve fluid energy when serving power cylinders, reciprocating pumps or diverter valves.

In one application such a directional valve was used in a valve cylinder combination. In another application this type of tandem directional valve has successfully operated two single acting power cylinders in series, with the exhaust of the first cylinder feeding and actuating the second cylinder when operator of this valve was energized, until finally axhausting to the outside via exhaust port after returning second cylinder to the first position-deenergized, while the first cylinder became fully energized the moment the operator was deenergized, all performed by the pressurized working fluid that enetered the normally open fluid port to feed first cylinder and to continue in tandem flow to the second port to feed and energize the second cylinder at will until final exhaust of the working fluid to the outside, and/or return to the reservoir.

In applications such as reciprocating pumps that employ power cylinder-piston rods for displacement of fluids under load when energized by pneumatic/hydraulic working fluids, the piston is required to move forward under load opposed by the pumping fluid force; for performing usefull work of pumping, this tandem valve can be used succesfully allowing the pump operation with energy conservation when coupled with a cylinder operation, through utilization of cylinder exhaust redirected to the pump driving end for pump operation at no cost.

These and other objects and advantages of the invention will become more fully apparent from the following description of an embodiment of the invention taken together with the accompanying drawings.

Figure 1B:
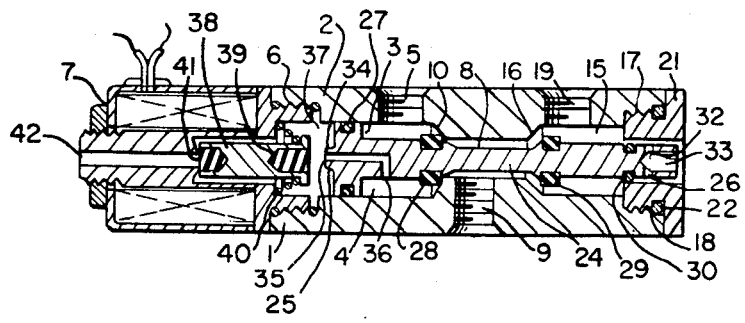
Figure 1C:
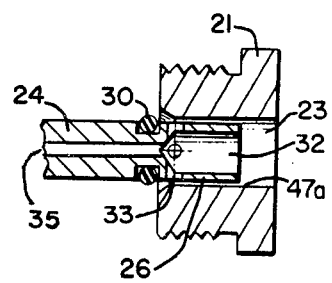
Figure 1D:
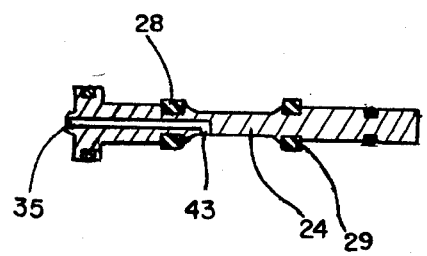

In the drawings,

FIG. 1-a is a cross-sectional view of an internally piloted solenoid operated valve with first port open for fluid communication with a supply source and a second port normally open to a first receiver while third port is exhausting.

FIG. 1-b shows the same valve with supply and exhaust ports closed while second and third ports open for fluid communication therebetween.

FIG. 1-c shows stem end modified for increaded exhaust, and includes central hole.

FIG 1-d identifies modified internal pilot fluid passage in the stem.

Refering to FIG. 1-a we find an energy conserving directional tandem valve 1 receiving pressurized fluid from a source 11 via first fluid port 5 adaptable for feeding through a normally open second port 9 a receiver such as a first power cylinder (not shown) via conduit-arrow 12, while a third port 19 adaptable for feeding in series fluid flow through the valve and for subsequent exhausting another receiver such as a second power cylinder (not shown), or a pump driving end with energy saving is shown to be in direct communication with a main valve exhaust bore 23 for atmospheric exhaust or for return of fluid to reservoir via bore 23-arrow 14. Valve 1 includes a central elongated housing member 2 having an axially extending cylindrical bore 3 with enlarged annular portion 4 communicating directly with a perpendicular side port 5. One end of bore 3 is further enlarged and threaded at 6 to receive an electrically energized solenoid operator 7 representing valve operating end adjacent the beginning of annular portion 4 of which the opposite end is reduced to result in a smaller annular portion 8 which is in direct communication with a second port 9.

A tapered shoulder 10 separating annular portions 8 and 4 of bore 3 serves as valve sealing shoulder means for closing fluid communication between first port 5 and second port 9. At the end of annulus 8 the bore 3 increases to provide enlarged annular portion 15, including another valve sealing tapered shoulder 16 for closing fluid communication between annular portions 8 and 15 when needed. At the extreme bore end 3 where annulus 15 terminates, and opposite to the solenoid end 6, the valve bore 3 is provided with large open receiver end 17 adaptable to be closed by an end cap 21 with appropriate seal 22 to enter counterbore 18 provided therein. Bore 23 in the end cap 21 represents the main valve exhaust port means. Annulus 15 is provided with a third side port 19 for fluid supply and exhaust of a second cylinder (not shown) or a pump end (not shown). To note is the fact that the valve operator is shown to be independent of the valving section with large ports. An elongated stem 24 with undercut piston head 25 and appropriate seal 27 at one end and a round stem end 26 with appropriate seal 30 at the other stem end including seal 28 spaced along the stem some distance away from the piston head 25 and seal 29 spaced along the stem some distance away from the round stem end 26 is slidably received inside housing bore 3 to axially shift therein and to change positions from that shown in the FIG. 1-a to that identified in FIG. 1-b.

In the center of piston head 25 facing solenoid 7 to form a cavity 37 a small protrusion 34 is provided. In the protrusion 34 we find a small hole 35 entering piston head and continuing down into the stem to exit on the opposite piston head side at point 36 and before the seal 28. Hole 35 thus may provide fluid communication means between fluid feed port entering annulus 4 and solenoid cavity 37. A solenoid plunger 38 provided with seals 39 and 41 at each end is shown to be centrally situated inside valve housing bore 3 and serves the purpose of either keeping hole 35 closed when solenoid is not energized by virtue of the associated spring 40 it retains, or keeping solenoid exhaust port 42 closed and cavity 37 pressurized when solenoid is energized. When solenoid is energized during valve operation causing plunger 38 to unseat hole 35, a pressurized fluid enters cavity 37 via hole 35 to act over piston head 25 with resultant shift of the stem 24 from the original position shown in FIG. 1-a to the second position shown in FIG. 1-b and corresponding redirection of fluid flow through the valve by shutting off fluid supply from port 5 to port 9 and also fluid exhaust from bore 23 while simultaneously opening previously closed communication means between ports 9 and 19 for tandem directional flow of fluid from first receiver to the second receiver. FIG. 1-b clearly illustrates condition wherein the solenoid plunger being energized enables stem shifting by pressurized fluid in cavity 37 with resultant fluid flow from port 9 to port 19 via annuluses 8 and 15, while FIG. 1-a shows solenoid to exhaust with plunger seated over hole 35 and fluid flow reestablished between ports 5 and 9 while port 19 is to exhaust, via bore 23 representing a valve end port.

FIG. 1-c showing stem end 26 enlarged identifies a counterbore 32 with cross drilled holes 33 adjacent to stem seal 30 for increased fluid exhaust beyond original exhaust annulus 47-a inside fluid exhaust bore 23. Further, stem also identifies end of hole 35 that may be drilled therethrough starting with piston head 25, and continuing down into the stem to exit at the other round stem end 26 for use with this valve when fluid supply is redirected to intiate at port 23 rather than port 5 identified in FIG. 1-a, constituting a rather obvious modification of this design. Another obvious stem modification is shown in FIG. 1-d illustrating stem hole 35 exiting at point 43 along the stem 24 between seals 28 and 29 for use with this valve when fluid supply is initiated through port 9.

Additional obvious valve modification is to have solenoid replaced with other operating means for shifting stem therein, be it manual, cam operator means, or simple plunger operator means with or without stem internal pilot fluid passages.

It will be understood that variations and modifications may be elected without departing from the novel concepts of the present invention.

What is claimed is:

1. An energy conserving tandem directional valve comprising:

a multiported longitudinal valve housing having first and second ends interconnected by a bore extending therethrough, said bore having a first diameter portion adjacent said first end extending inwardly therefrom toward said second end, a second diameter portion adjacent said second end extending inwardly therefrom toward said first end and a third diameter portion interconnecting the innermost ends of said first and second diameters, said first and second diameter portions having larger diameters than said third diameter portion, including shoulders at the interconnection of said diameters with a first shoulder facing said housing first end and a second shoulder facing said housing second end, said housing further including at least three perpendicular ports extending through said housing and communicating with said bore extending therethrough, one of said ports comprising a first fluid supply port communicating with said first diameter portion adjacent said first housing end and adaptable to be connected to the pressurized fluid source, another of said ports comprising a second fluid port communicating with said third diameter portion and adaptable to be connected to a first fluid receiver, the remaining port comprising a third fluid port communicating with said second diameter portion adjacent said second housing end and adaptable to be connected to a second fluid receiver, said second bore end being closed by an end cap provided with a central opening therethrough comprising a main valve exhaust port open to atmosphere, said second and said third ports receiving and exhausting said pressurized fluid from said first fluid port in tandem flow therethrough, said first bore end receiving slidably an elongated stem with a piston at one end and a smaller diameter opposite stem end round, said piston being of close sliding fit with the housing having a seal received slidably inside said first diameter portion with said piston head including an end face, a second seal in said stem received inside said first diameter portion and spaced along said stem from said piston adjacent said first shoulder with a seal diameter of less than the diameter of said piston but greater than said third diameter portion, a third seal in said stem received inside said second diameter portion and spaced along said stem adjacent said second shoulder with a seal diameter greater than said third diameter portion but less than the diameters of said piston and of said second diameter portion, and a final seal on said opposite stem end adjacent said end cap sized to permit close sliding fit inside said exhaust port of said end cap opening, said stem being selectively shifted between a first position wherein said fluid communication is permitted between said fluid supply and said first fluid receiver port but is precluded from entering said second fluid receiver port by said third seal being firmly seated against said second shoulder while simultaneously allowing fluid communication between said second fluid receiver port and said exhaust port, and a second position wherein fluid communication is permitted between said first and second receiver ports while having said second seal firmly seated against said first shoulder to preclude fluid communication between said fluid supply port and said first fluid receiver port and also having said final seal engaged inside said main valve exhaust port to preclude fluid exhaust into the atmosphere, said stem further including a small fluid passage extending therethrough from said first diameter portion to said piston end face for selectively allowing fluid flow from said first diameter portion through said fluid passage and outwardly from said end face, a solenoid valve operator disposed at said first bore end of said housing, said operator having a plunger disposed generally coaxial with said stem and axially movable selectively in an operative relationship with solenoid energization between an open position spaced from said end face of said piston and defining a fluid cavity therebetween and a closed position in blocking engagement with said small passage at said end face, wherein when said plunger is in said closed position said stem is retained in said first position by fluid entering a first annulus formed between said stem and said first diameter portion said fluid acting on said piston with a force large enough to maintain said third seal firmly seated against said second shoulder when said stem is in said first position with said valve being open to full pressure of the working fluid for feeding said first receiver port while said main valve exhaust port is open to atmosphere allowing said second receiver port to simultaneously exhaust, and wherein when said plunger is in said open position said stem is shifted to said second valve closed position by fluid entering said cavity through said passage in said piston end face and acting against said piston head end face exposed to said cavity with a force large enough to maintain said second seal firmly seated against said first shoulder while allowing full pressure from said first receiver port to enter said second receiver port, said solenoid valve operator further including means for exhausting fluid from said cavity as said plunger is moved from said open toward said closed position, including spring biasing means for continuously exerting a biasing force on said plunger to force said plunger toward said closed position, whereby when said solenoid valve operator is de-energized said spring biasing means forces said plunger from said open to said closed position, energization of said solenoid causing said plunger to overcome said biasing force of said biasing means in moving from said closed to said open position.

2. An energy conserving tandem directional valve comprising:

a multiported longitudinal valve housing having first and second ends interconnected by a bore extending therethrough, said bore having a first diameter portion adjacent said first end extending inwardly therefrom toward said second end, a second diameter portion adjacent said second end extending inwardly therefrom toward said first end and a third diameter portion interconnecting the innermost ends of said first and second diameters, said first and second diameter portions having larger diameters than said third diameter portion, including valve sealing shoulders at the interconnection of said diameters with a first sealing shoulder facing said housing first end and a second sealing shoulder facing said housing second end, said housing further including at least three perpendicular side ports extending through said housing and communicating with said bore extending therethrough, one of said ports comprising a first port communicating with said first diameter portion adjacent said first housing end, another of said ports comprising a second port communicating with said third diameter portion, the remaining port comprising a third fluid port communicating with said second diameter portion adjacent said second housing end, said second bore end being closed by an end cap provided with a central opening therethrough comprising a valve end port, said first bore end receiving slidably an elongated stem with a piston at one stem end and a smaller diameter opposite stem end, said piston being of close sliding fit with the housing bore and having a seal received slidably inside said first diameter portion with said piston head including an undercut receiving said seal, a second seal in said stem smaller diameter received inside said first diameter portion and spaced along said stem from said piston adjacent said first valve sealing shoulder with a seal diameter of less than the diameter of said piston but greater than said third diameter portion, a third seal in said stem received inside said second diameter portion and spaced along said stem adjacent said second valve sealing shoulder with a seal diameter less than the diameter of said piston but greater than said third diameter portion, and a final seal on said opposite stem end adjacent said end cap sized to permit close sliding fit inside said valve end port of said end cap opening, said stem being selectively shifted between a first position permitting fluid communication between said first and second ports but precluding flow between said second and said third port while simultaneously allowing fluid communication between said third port and said valve end port, and a second position allowing fluid communication between said second and third ports while closing fluid communication between said first and second ports and said third port and valve end port, a valve operator means disposed at said first bore end of said housing in an operative relationship with said stem, said operator means being movable between a first and a second position, wherein when said valve operator means is in said first position, said stem is retained in said first position by the fluid entering one of said valve ports with a pressure force large enough to maintain said third seal firmly seated against said second valve sealing shoulder when said stem is in said first position allowing fluid communication between said first and second ports and also between said third port and valve end port, and wherein when said valve operator means is moved to a second position, said stem is shifted to said second position wherein said second seal is firmly seated against said first valve sealing shoulder closing fluid communication between said first and second ports and allowing fluid communication between said second and third ports while simultaneously closing said valve end port, said first port and said valve end port being selectively choosable as supply ports.

3. A valve as in claim 2 wherein said piston head includes an end face opposite said piston undercut, said stem further including a small fluid passage extending therethrough from said piston end face for selectively allowing fluid flow from said fluid supply port and through said fluid passage outwardly from said end face to act over said piston head.

4. A valve as in claim 3 wherein said valve operator means includes a plunger disposed coaxially with said stem and axially movable selectively between an open position spaced from said end face of said piston and defining a fluid cavity therebetween and a closed position in blocking engagement with said small fluid passage in said piston end face, wherein when said plunger is in said closed position said stem is retained in said first position by pressurized fluid entering said first port and acting against said piston exposed thereto with a pressure force large enough to maintain said third seal firmly seated against said second sealing shoulder, and wherein when said plunger is in said open position said stem is moved to said second position by the pressure force acting through said small fluid passage against said end face of said piston head, said pressure force being large enough to maintain said second seal firmly seated against said first sealing shoulder, said operator means further including means for exhausting fluid from said cavity as said plunger is moved from said open to said closed positions thereby permitting an automatic return of said stem to the original first position by said pressurized fluid entering said first port and acting over said stem surfaces exposed thereto.

5. A valve as in claim 1 wherein said smaller diameter round stem end is counterbored partway inwardly and provided with a multitude of small perpendicular holes adjacent said final seal.

6. A valve as in claim 4 wherein said valve operator means is of electrical solenoid type.

* * * * *